United States Patent [19]

Aho et al.

[11] Patent Number: 5,415,260
[45] Date of Patent: * May 16, 1995

[54] SELECTIVE DRIVE FLUID COUPLING

[75] Inventors: Richard E. Aho, Fort Lauderdale; Martin Baker, Moore Haven, both of Fla.

[73] Assignee: MileMarker, Inc., Pompano Beach, Fla.

[*] Notice: The portion of the term of this patent subsequent to Nov. 15, 2011 has been disclaimed.

[21] Appl. No.: 253,146

[22] Filed: Jun. 2, 1994

Related U.S. Application Data

[62] Division of Ser. No. 5,562, Jan. 19, 1993, Pat. No. 5,363,948.

[51] Int. Cl.⁶ .......................... F16D 3/80; F16D 35/00; F16D 7/00
[52] U.S. Cl. ..................................... 192/58 R; 464/24; 464/30
[58] Field of Search .................. 192/58 R, 58 A, 58 B, 192/58 C, 56 R, 56 F; 464/24, 30

[56] References Cited

U.S. PATENT DOCUMENTS

| | | | |
|---|---|---|---|
| 1,238,447 | 8/1917 | Severy | 192/58 C |
| 2,708,018 | 5/1955 | Dudley | 192/58 R |
| 2,863,542 | 12/1958 | Kelsey | 192/58 R |
| 3,852,977 | 12/1974 | Chaput | 464/30 X |
| 4,031,780 | 6/1977 | Dolan et al. | |
| 4,037,429 | 7/1977 | Britzius | |
| 4,083,419 | 4/1978 | Fogelberg | |
| 4,132,297 | 1/1979 | Brown et al. | |
| 4,332,304 | 6/1982 | Barnow | |
| 4,557,359 | 12/1985 | Woodbridge | |
| 4,650,028 | 3/1987 | Eastman et al. | |
| 4,677,875 | 7/1987 | Batchelor | |
| 4,714,129 | 12/1987 | Mueller | |
| 4,782,930 | 11/1988 | Kuroiwa et al. | |
| 4,928,803 | 5/1990 | Ishikawa et al. | |
| 4,949,594 | 8/1990 | Galhotra | |
| 4,962,837 | 10/1990 | Teroka | 192/58 C |
| 5,006,098 | 4/1991 | Yoshinaka et al. | |
| 5,117,937 | 6/1992 | Namioka | |

FOREIGN PATENT DOCUMENTS

| | | | |
|---|---|---|---|
| 2-57729A | 2/1990 | Japan | 192/58 B |
| 3-103624A | 4/1991 | Japan | 192/58 R |
| 1333878 | 10/1973 | United Kingdom | |
| 1633192 | 3/1991 | U.S.S.R. | 192/58 A |

*Primary Examiner*—Richard M. Lorence
*Attorney, Agent, or Firm*—Luedeka, Neely & Graham

[57] ABSTRACT

The specification discloses a fluid coupling for connecting rotatable shafts. In one embodiment, rotation of an output shaft is transferred to a drive shaft by a pair of opposed rotatable rings having interleaved fins. The interleaved fins provide fluid filled chambers and relative movement of the fins compresses the fluid and increases the ability of the fluid to transfer torque.

7 Claims, 5 Drawing Sheets

SELECTIVE DRIVE FLUID COUPLING

This is a division of application Ser. No. 08/005,562, filed Jan. 19, 1993, now U.S. Pat. No. 5,363,948.

TECHNICAL FIELD

The present invention relates generally to coupling systems for connecting rotating shafts. More particularly the present invention relates to a fluid coupling for multi-wheel-drive (e.g. four wheel drive) vehicles.

BACKGROUND

Fluid couplings for vehicles conventionally use interleaved disks housed in a chamber containing a highly viscous fluid. Examples of such couplings are described in U.S. Pat. Nos. 4,650,028 and 5,117,937. These devices have several disadvantages. For example, they are often large in size and complex in configuration. The present invention is advantageous in that it avoids the complexity and size restraints of fluid couplings based on interleaved discs.

SUMMARY OF THE INVENTION

Accordingly it is an object of the present invention to provide an improved fluid coupling;

It is yet another object of the present invention to provide a fluid coupling that is smaller than conventional interleaved disk couplings;

Still another object of the present invention is to provide a fluid coupling of the character described that is uncomplicated in configuration as compared to conventional interleaved disk couplings;

Yet another object of the present invention is to provide a fluid coupling that increases torque transfer in response to relative movement between coupling surfaces by exerting pumping forces on the fluid.

Having regard to the foregoing objects, the present invention is directed generally to a fluid coupling for coupling a first rotatable member to a second rotatable member. The coupling comprises a reservoir positioned between the first and second rotatable members for containing a viscous fluid; and pump structure associated with the reservoir for exerting pumping forces on the viscous fluid to transfer torque from the first rotatable member to the second rotatable member. The pump structure includes a first rotatable body having a first pump surface rotatable in response to rotation of the first rotatable member for exerting pumping forces on the fluid, a second rotatable body having a second pump surface rotatable in response to the pumping forces and associated with the second rotatable member for transmitting pumping forces from the fluid to the second rotatable member, and at least one chamber defined between the first and second pump surfaces for containing an amount of the viscous fluid, the chamber being movable relative to the first pump surface in response to relative movement between the first and second pump surfaces to produce pumping forces.

The present invention is particularly well-suited for use with four wheel drive vehicles. To this end, the invention is described below in connection with a fluid coupling for use with four wheel drive vehicles.

These and other objects, features and advantages of the present invention will become apparent from the following detailed description and when considered in accordance with the appended claims and accompanying drawings, in which:

DETAILED DESCRIPTION OF A PREFERRED EMBODIMENT

Figure 1:
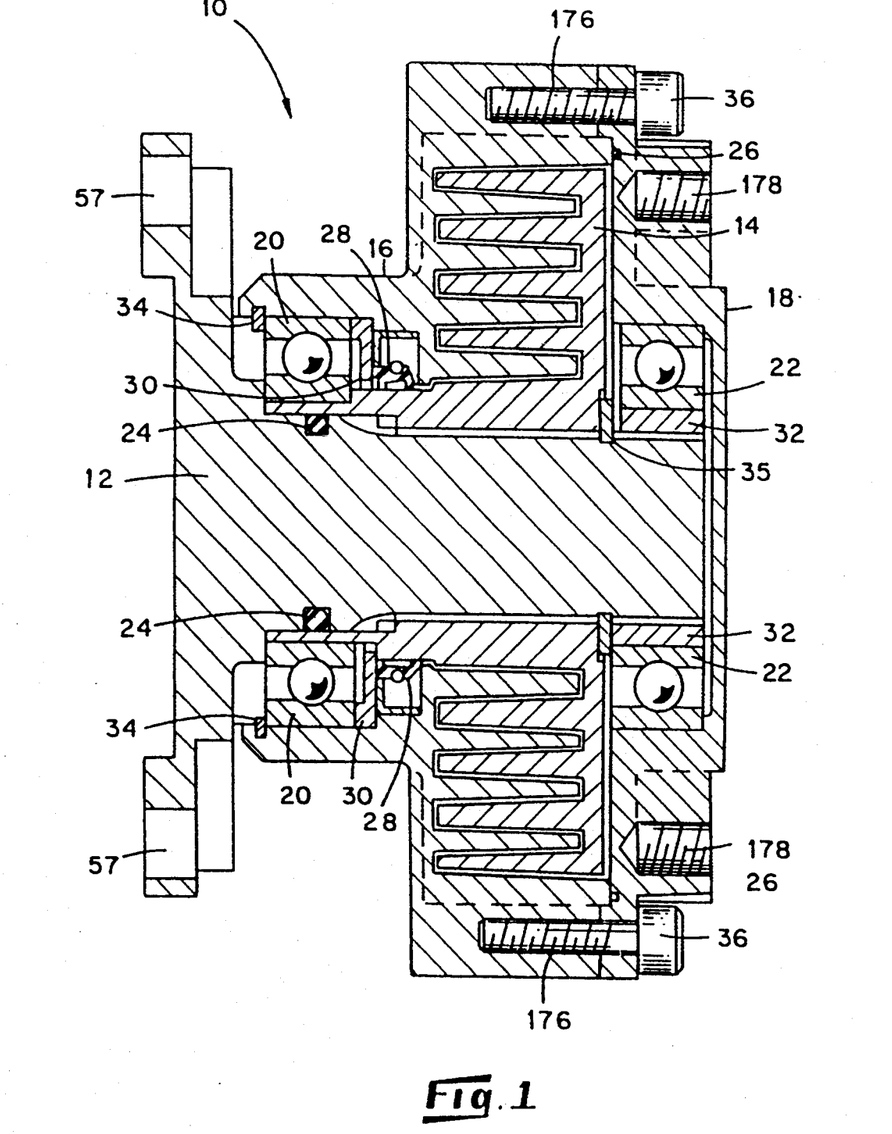
FIG. 1 is a cross-sectional view of a preferred embodiment showing a fluid coupling in accordance with the present invention.

Referring now to the drawings, in which like characters refer to like parts throughout the several views, FIG. 1 shows a fluid coupling 10 embodying the present invention. Dimensions are provided in the description for example only. It will be understood that the coupling of the present invention may be made in the other sizes. The coupling 10 includes, as major components, a rotatable splined shaft 12, a rotatable center ring 14, a rotatable body ring 16 and a cap 18. Each of the above components is preferably formed of a durable material, such as hardened steel.

A pair of roller bearings 20 and 22, a pair of O-rings 24 and 26, a fluid seal 28, a washer 30, a bushing 32, a pair of retaining rings 34, 35 and a plurality of bolts 36 are included as minor components.

Briefly described, the coupling 10 is assembled as follows. The seal 28, washer 30, and bearing 20 are press-fit, in sequence, onto the body ring 16 and held in place by retaining ring 34, and the body ring is filled with a highly viscous fluid, preferably silicone having a rating of about 30,000,000 centipoise. The center ring 14 is then press-fit into the bearing 20 of body ring 16, as will be described more fully below, to provide a fluid filled reservoir therebetween. The resulting structure is fittingly received on the shaft 12 with O ring 24 and held in place by the retaining ring 35. The bearing 22 and the bushing 32 are then press-fit onto the cap 18 and the cap 18 is bolted to the body ring 16 with the bolts 36 to complete assembly of the coupling.

Figure 2:
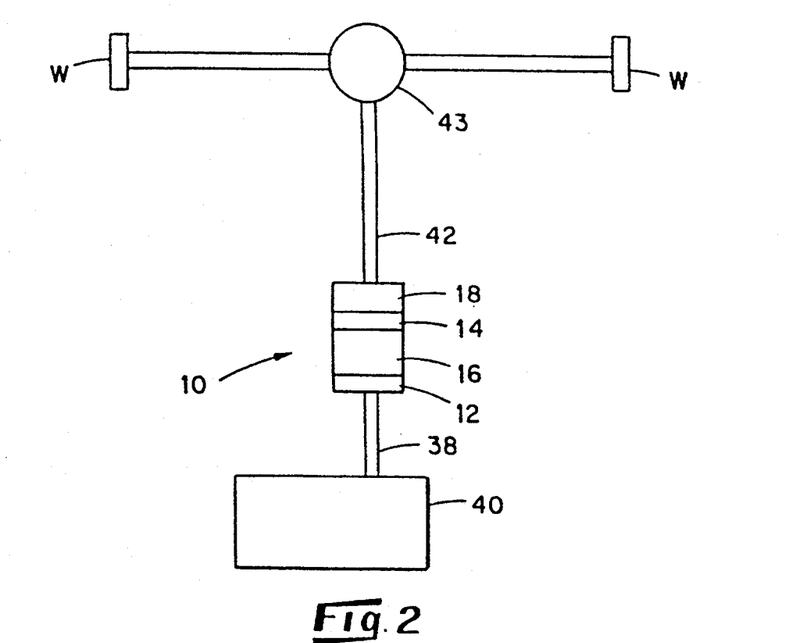
FIG. 2 is a schematic diagram showing the coupling of FIG. 1 positioned to couple the transfer case a four-wheel drive vehicle to the front drive shaft of the vehicle.

In one embodiment, shown in FIG. 2, the shaft 12 is connected, as by bolts, to flanged output shaft 38 of transfer case 40 of a four-wheel drive vehicle and the cap 18 is connected, as by bolts, to a flanged U joint (not shown) that is connected to front drive shaft 42 of the vehicle. The drive shaft 42 is connected via differential 43 to front wheels W of the vehicle. In operation, the shaft 12 is rotated by the flanged output shaft 38 from the transfer case 40. The center ring 14 is directly connected to the shaft 12 and rotates in response to rotation of the shaft 12. Rotation of the center ring 14 is transferred to the body ring 16 by the viscous fluid contained in the reservoir between the body ring 16 and the center ring 14 to rotate the body ring 16. The cap 18 is directly connected to the body ring 16 by the bolts 36 and to the drive shaft 42, as by bolts, so that rotation of the body ring 16 results in rotation of the drive shaft 42 of the four-wheel drive vehicle. Rotation of the driveshaft 42 is transferred through differential 43 to the wheels W. As will be explained more fully below, the center ring 14 and the body ring 16 are rotatably coupled solely by the viscous fluid. Therefore the body ring 16 and the center ring 14 may slip relative to one another (i.e. the center ring 14 and the body ring 16 are capable of rotational movement relative to one another), such as when the resistance to turning of the drive shaft 42 is great. As will be seen, the configuration of the center ring 14 and the body ring 16 and their position relative to one another results in a "pumping action" on the fluid when the body ring 16 and center ring 14 slip or move relative to one another. This pumping action compresses the fluid and the compressed fluid is capable of transferring more force from the center ring 14 to the body ring 16 than uncompressed fluid. In this manner, the torque transferred from the center ring 14 to the body ring 16, and hence from the transfer case 40 to the drive shaft 42, increases as more relative slip occurs between the center ring 14 and the body ring 16.

Accordingly, as used herein, the terms "pump", "pumping" and "pumping action" refer to forces acting on the viscous fluid when the center ring 14 and the body ring 16 move relative to one another and to the effect of these pumping forces on increasing the torque transferred from the center ring 14 to the body ring 26 as more relative slip occurs. Accordingly, in the absence of relative slip, the center ring 14 and the body ring 16 rotate at the same rotational rate and there is no "pumping action" on the viscous fluid.

Shaft

Figure 3:
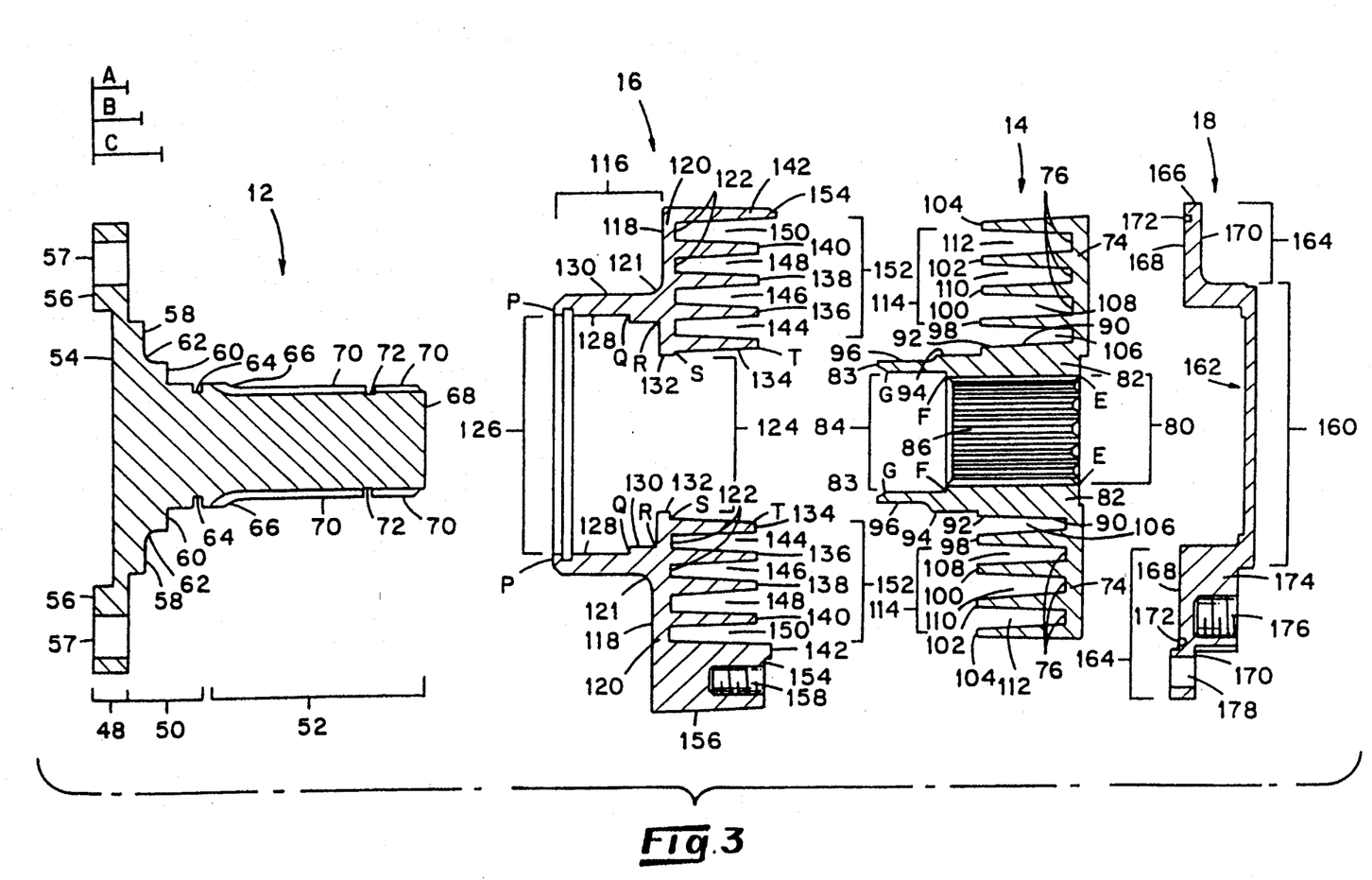
FIG. 3 is an exploded view of FIG. 1.

With further reference to FIG. 1 and with reference to FIG. 3, the shaft 12 includes a circular base section 48, a circular intermediate section 50, and a cylindrical splined section 52.

A circular recess in the form of a blind bore 54 is defined on side 56 of the base section 48 opposite the intermediate section 50 to fittingly receive the output shaft 38 of the transfer case 40. The base section 48 has a thickness A of about 0.34 inches, an outer diameter of five inches. The bore 54 has a diameter of about 3 inches and a depth of 0.2 inches. Bolt openings 57 are defined through the thickness of the base section 48 for bolting the shaft 38 to the shaft 12.

The intermediate section 50 defines annular shoulders 58 and 60 for rotationally engaging the body ring 16 and the center ring 14, respectively. The shoulder 58 is spaced a distance B of about 0.6 inches from the side 56 of the base section 48 and the shoulder 60 is spaced a distance C of about 0.812 inches from the side 56 of the base section 48. A curved annular surface 62 having a radius of curvature of about 0.125 inches is provided between the shoulders 58 and 60 for rotatably engaging the roller bearing 20. The diameter of the shoulder 60 adjacent the surface 62 is about 1.9 inches and the diameter of the shoulder 60 opposite the surface 62 is about 1.4 inches.

An annular groove 64 is defined on the intermediate section 50 at a location between the shoulder 60 and the splined section 52 of the shaft 12. The groove 64 is sized to receive the O-ring 24 having an I.D. of 1 ⅛ inches, an O.D. of 1⅜ inches, and a width or thickness of ⅛ inch. The O-ring 64 is provided to prevent leakage of the viscous fluid along the shaft 12.

The splined section 52 has a curved base 66 adjacent the intermediate section 50 and terminates at a flat tip end 68 located about 1.7 inches from the base 66. The base 66 preferably has a radius of curvature of about 0.125 inches.

A plurality of elongate splines 70 are defined on the periphery of the splined section 52 between the base 66 and the tip end 68. Preferably there are about 19 of the splines, each spline 70 having a pitch of about 16/31, a pressure angle of 30°, and a major diameter of about 1.246 inches.

An annular groove 72 is defined on the splined section 52 at a location about 1.17 inches from the tip end 68 so that it bisects the splines 70 at this point. The groove 72 is sized to receive the retaining ring 35 to hold center ring 14 on shaft 12.

The center ring 14 is provided by a flat disk 74 having a diameter of about 4.63 inches and a front surface 76 spaced apart from a rear surface 78 so that the disk 74 has a thickness of about 0.150 inches. An opening 80 is defined across the central thickness of the disk 74 and is sized to fittingly receive the splined section 52 of the shaft 12 therethrough.

A cylindrical extension 82 having an inner diameter between points E and F corresponding generally to the diameter of the opening 80 extends outwardly from the front surface 76 of the disk 74. The inner diameter of the extension 82 between points F and G is sized to slip over the intermediate section 50 of the shaft, as best seen in FIG. 1, and the extension terminates in an annular beveled surface 83 adjacent point G.

The extension 82 is integral with the front surface 76 adjacent the opening 80 so that together the extension 82 and the opening 80 provide an elongate tunnel 84 for receiving the splined section 52 of the shaft 12. A plurality of teeth 86 are provided on the inner periphery of the extension 82 between points E and F for engaging the splines 70 of the shaft 12 so that rotation of the shaft 12 rotatably drives the center ring 14.

Outer periphery 90 of the extension 82 is of stepped configuration and provides annular shoulders 92, 94, and 96. The shoulder 92 is adjacent the front surface 76 and has a width of about 1 inch and an outer diameter of 1.91 inches, the shoulder 94 is adjacent the shoulder 92 opposite the front surface and has a width of about 0.56 inches and an outer diameter of about 1.75 inches, and the shoulder 96 is adjacent the shoulder 94 opposite the shoulder 92 and has a width of about 0.58 inches and an outer diameter of about 1.57 inches. The shoulder 92 is preferably tapered such that it decreases in thickness in a direction away from the front surface 76, as will be explained more fully below.

Annular fins 98, 100, 102 and 104 extend outwardly about 1 inch from the front surface 76 in a direction such that the major surfaces of the fins 98–104 are generally perpendicular to the front surface 76. The fins 98–104 are substantially concentric and are preferably substantially circular in cross-section and tapered such that they decrease in thickness in a direction away from the front surface 76, as will be explained more fully below.

Corresponding and substantially concentric annular cavities 106, 108, 110, and 112 are defined between adjacent annular surfaces of the fins 98, 100, 102, 104, and the extension 82, to wit: annular cavity 106 is formed by the outer periphery 90 of the extension 82 and the inner diameter of fin 98, annular cavity 108 is formed by the outer periphery of fin 98 and the inner periphery of the fin 100, annular cavity 110 is formed by the outer periphery of fin 100 and the inner periphery of fin 102, and annular cavity 112 is formed by the outer periphery of fin 102 and the inner periphery of fin 104.

Together, the fins 98–104 and cavities 106–112 provide a contoured annular pump surface 114 that cooperates with the body ring 16 to exert pumping forces on the viscous fluid when the center ring 14 and the body ring 16 move relative to one another during operation of the coupling, as will be explained more fully below.

Figure 4:
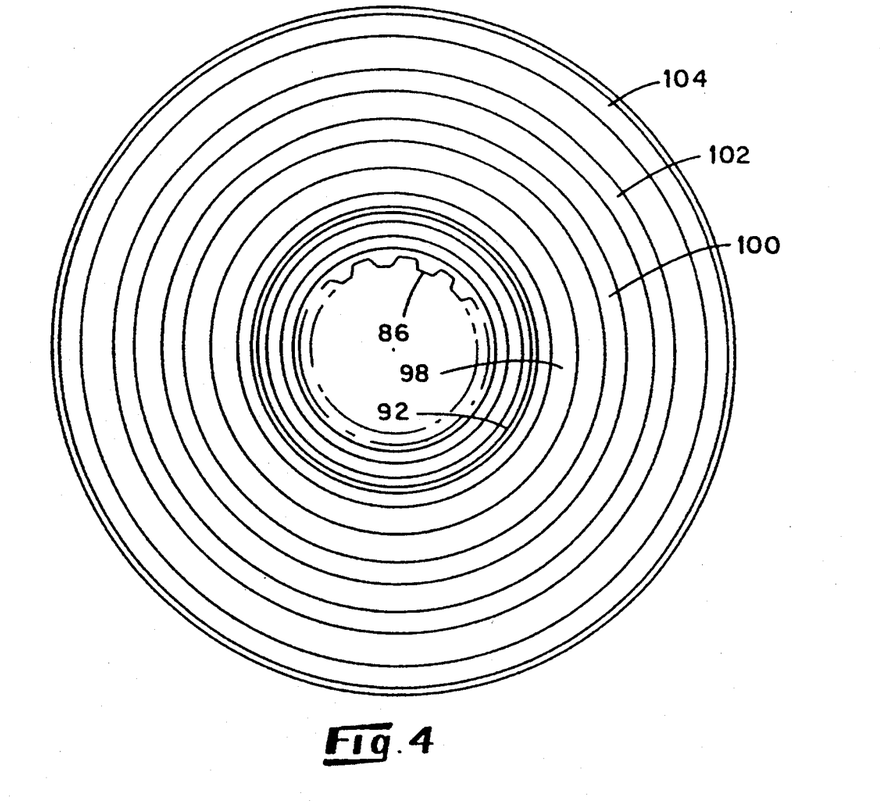
FIG. 4 is a front view of a center ring having circular fins.

With reference now to FIG. 4 there is shown a front view of a preferred embodiment of the center ring 14. In this embodiment, the fins 98–104 are preferably substantially circular in shape and are preferably substantially concentric, although it will be understood that the fins may be noncircular and/or nonconcentric. In addition, it will be understood that virtually any number of fins may be provided, depending on the desired torque characteristics.

As shown in FIG. 4, the fins 98–104 appear as series of concentric cylinders that extend lengthwise from the surface 76 of the center ring 14. Examples of noncircular fin shapes include oval, octagonal, hexagonal shaped fins that appear as sockets extending lengthwise from the front surface 76, or any similar shaped fins to create the described pumping action, as will be explained more fully below.

To provide example of the compact size of the coupling, the embodiment of FIG. 4 provides fins 98–104 as follows. The fins 98–104 have a cylindrical length of about 1 inch and are tapered in accordance with the foregoing description of fin 98. The fins 98–104 shown in FIG. 4 have inner diameters (measured from their minimum taper or thickness) as follows:

| Fin | I.D. (inches) |
|---|---|
| 98 | 2.2 |
| 100 | 2.8 |
| 102 | 3.6 |
| 104 | 4.3 |

Body

The body 16 has a generally cylindrical section 116 connected, as by welding, to a rear surface 118 of a flat disk 120 to provide a curved surface 121 having a radius of curvature of about 0.125 inches. The rear surface 118 is spaced apart from a front surface 122 of the disk 120 such that the disk has a width or thickness of about 0.079 inches. An opening 124 is defined across the central thickness of the disk 120 and is concentrically and abuttingly aligned with a cylindrical opening 126 defined by the inner periphery of the cylindrical section 116.

The opening 124 and opening 126 are sized to receive the outer periphery 90 of the extension 82, as best seen in FIG. 1. To this end, the cylindrical section 116 provides an annular shoulder 128 having a length of about 0.9 inches and an inner diameter of about 2.67 inches between points P and Q, and an annular shoulder 130 having a length of about 0.32 inches and an inner diameter of about 2.5 inches between points Q and R.

The opening 124 provides an annular shoulder 132 located adjacent the shoulder 130 and having a length of about 0.08 inches and a diameter of about 1.75 inches between points R and S, and is tapered between points S and T to correspond to the taper of the shoulder 92 of the center ring 14.

Annular fins 134, 136, 138, 140 and 142 extend outwardly from the front surface 122 in a direction such that the major surfaces of the fins 134–142 are generally perpendicular to the front surface 122. The fins 134–142 are substantially concentric but could be substantially noncircular, preferably oval, in cross-section and tapered such that they decrease in thickness in a direction away from the front surface 122, as will be explained more fully below.

Corresponding and substantially concentric annular cavities 144, 146, 148, and 150 are defined between adjacent annular surfaces of the fins 134–142, to wit: annular cavity 144 is formed by the outer periphery of fin 134 and the inner periphery of fin 136, annular cavity 146 is formed by the outer periphery of fin 136 and the inner periphery of the fin 138, annular cavity 148 is formed by the outer periphery of fin 138 and the inner periphery of fin 140, and annular cavity 150 is formed by the outer periphery of fin 140 and the inner periphery of fin 142. The cavities 146–150 are filled with viscous fluid prior to assembly of the coupling 12, as will be explained more fully below.

Together, the fins 134–142 and cavities 144–150 provide a contoured annular pump surface 152 that cooperates with the pump surface 114 of the center ring 14 to exert pumping forces on the viscous fluid when the center ring 14 and the body ring 16 move relative to one another during operation of the coupling 10.

An annular lip 154 is provided on the outermost peripheral edge of the fin 142 for engaging the cap 18. In addition, attachment surfaces 156 having threaded blind bores 158 are provided at selected locations adjacent the outer periphery of the fin 142 for receiving the bolts 36 so that the cap 18 may be bolted to the body ring 16.

Cap

The cap 18 generally resembles a hat in shape and has a crown 160 in the form of a blind bore 162 and a brim 164 in the form of a washer shaped disk 166 located at the open end of the bore 160.

The bore 160 has a depth of about 0.67 inches and an inner diameter of about 2.6 inches. Accordingly, it will be appreciated that the bore 162 has a depth sufficient to receive the section of the shaft 12 between the groove 72 and the tip 68, and has a diameter sized to fit over the bearing 22 and bushing 32 when positioned on the shaft 12, as best seen in FIG. 1.

The disk 166 has a front surface 168 spaced apart from a rear surface 170 so that the disk 166 has a thickness of about 0.25 inches. The inner diameter of the disk 166 corresponds to the diameter of the bore 162 and the outer diameter of the disk 166 corresponds generally to the outer diameter of the fin 142 of the body ring 16. A circular groove 172 is defined on the surface of disk 166 and is sized for O-ring 26. In a preferred embodiment, the groove 172 has a depth of about 0.05 inches and a width of about 0.09 inches.

Attachment surfaces 174 having smooth open bores 178 are provided on the rear surface 170 at locations corresponding to the threaded bores 158 on the body ring 16 for passage of the bolts 36. The bolts 36 are passed through the bores 178 and threaded into bores 158 to attach the cap 18 to the body ring 16. Bolt openings 176 are defined through the thickness of the disk 166 for bolting the cap 18 to the front drive shaft 42 of a four wheel drive vehicle.

Figure 5:
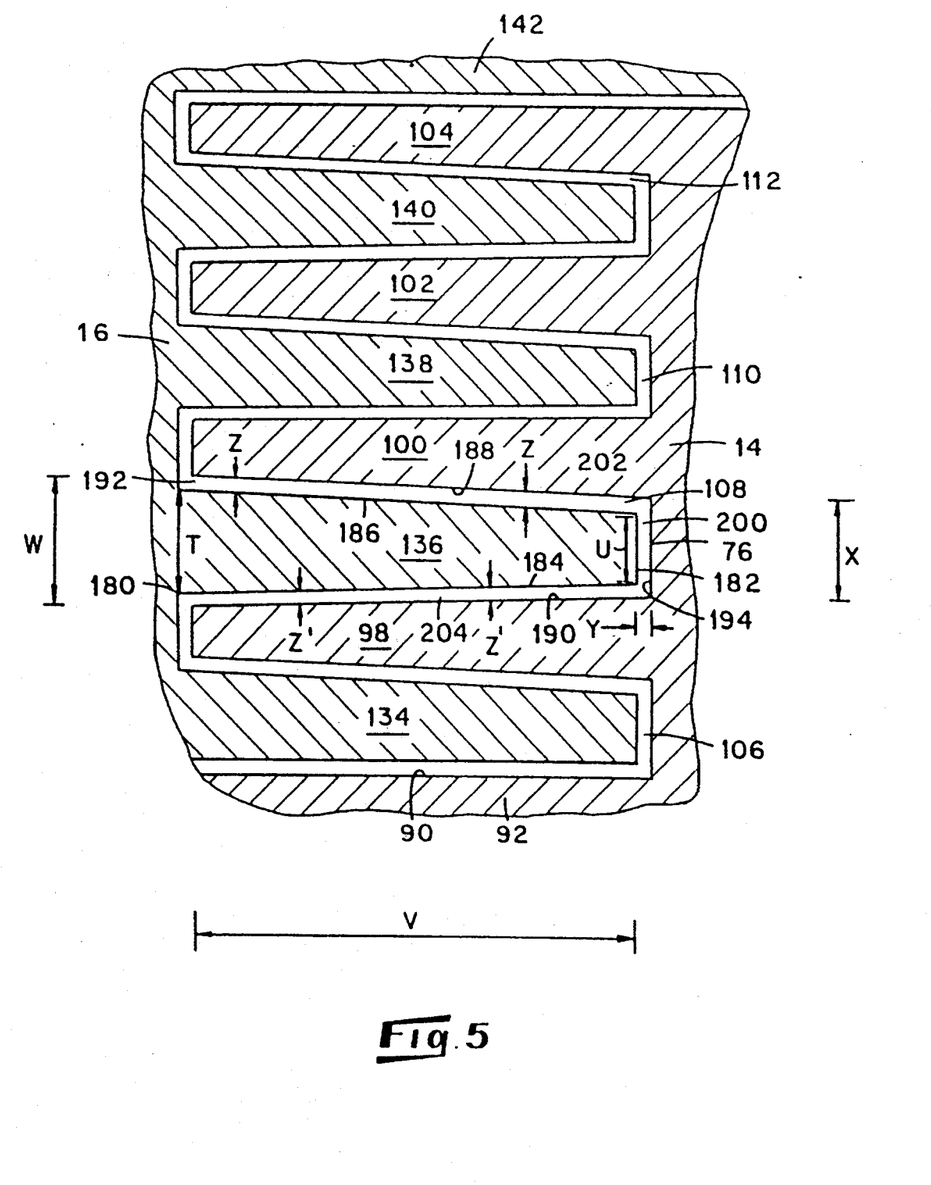
FIG. 5 is a close-up view of a portion of FIG. 1 showing the relationship between the annular fins of the center ring and the body ring in greater detail.

As mentioned previously, the center ring 14 is press-fit into the bearing 20 of body ring 16 during assembly of the coupling. To this end, as best seen in FIG. 5, the fins 98–104 of the center ring 14 are shown received within the cavities 144–150, respectively, of the body ring 16, and the fins 134–142 are shown received within the cavities 106–112, respectively, of the center ring 14 so that the fins are positioned in a compact interleaved relationship.

The depicted fins 98–104 and fins 134–142 (and hence the corresponding cavities) are uniform in size and taper, however, it will be understood that the fins may be nonuniform in size and taper. The fins 98–104 and fins 134–142 may be integrally formed with the center ring 14 and body ring 16, respectively or may be attached, as by welding, to the front surfaces 76–122 of the center ring 14 and body ring 16.

For sake of brevity, the relationship between the fins 98–104 and fins 134–142 will be described only with respect to cavity 108 formed by fins 98, 100 of the center ring and of the fin 136, it being understood that the remaining fins are similarly disposed.

The fin 136 has a base 180 adjacent the front surface 122 and terminates in a tip 182 located about 1 inch from the base 180. The base 180 has a thickness T of about 0.16 inches, and the tip 182 has a thickness U of about 0.11 inches so that the fin 136 has a bottom annular surface 184 spaced apart from a top annular surface 186 in accordance with the taper of the fin 98. The fin 136 is preferably of substantially uniform taper from the base 180 to the tip 182, however, it will be understood that the thickness of the fin may be varied and that areas of nonuniform taper may be provided if desired.

The cavity 108 has annular spaced apart sidewalls 188, 190 formed by the inner periphery of the fin 100 and the outer periphery of the fin 98, respectively. The cavity 108 therefore provides an annular, tapered blind bore having a depth V of about 1 inch. Open end 192 of the cavity has a width W of about 0.24 inches and blind or closed end 194 of the cavity is provided by the surface 122 of the center ring 14 and has a width X of about 0.18 inches. The cavity 108 is preferably of substantially uniform taper from the open end 192 to the closed end 194, however, it will be understood that the thickness of the fins may be varied in a manner that provided areas of nonuniform taper if desired.

With continued reference to FIG. 5, it will be seen that the tip 182 of the fin 136 is spaced a distance Y from closed end 194 to define an annular channel or chamber 200 and the sidewalls 188, 190 are spaced a distance Z and Z' from the sidewalls 184, 186, respectively, to define annular channels or chambers 202 and 204. The chambers 200, 202, and 204 are interconnected and provide a fluid filled annular space between the fin 136 and the cavity 108 in the assembled coupling 10. The distances Y, Z and Z' may be varied to adjust the size of the chambers 200, 202 and 204 to provide desired torque characteristics, as set forth in more detail below.

During assembly of the coupling 12, each of the cavities 146–150 is filled with viscous fluid prior to assembly of the coupling 12. During assembly, the fins 98–104 are pressed into the fluid filled cavities 146–150, respectively, to form the fluid filled chambers 200, 202, and 204 relative to the fin 136 and cavity 108 and similar fluid filled chambers with respect to the remaining fins and cavities, it being understood that the interleaved relationship could likewise be explained in terms of insertion of the fins 134–142 into cavities 106–112.

Figure 6:
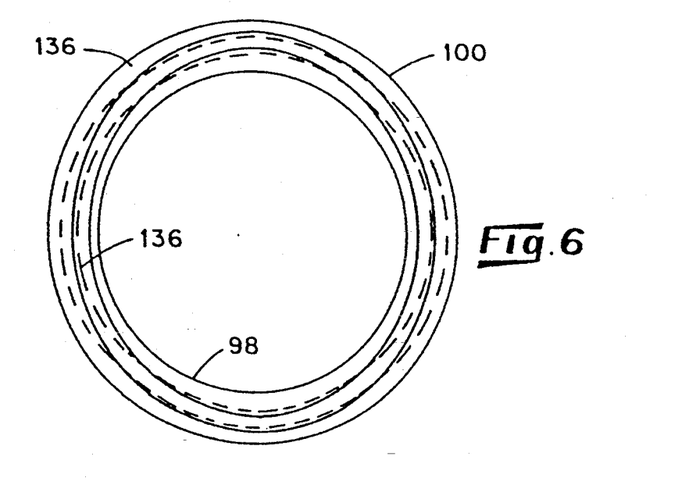
FIG. 6 is an exaggerated cross-sectional view showing a center ring having circular fins and a body ring having oval fins.

As mentioned previously, the fins 98–104 are preferably substantially circular and the fins 134–142 are preferably substantially noncircular, most preferably oval. FIG. 6 shows an exaggerated front cross-sectional view in which circular fins 98 and 100 are interleaved with oval fin 136.

Figure 7:
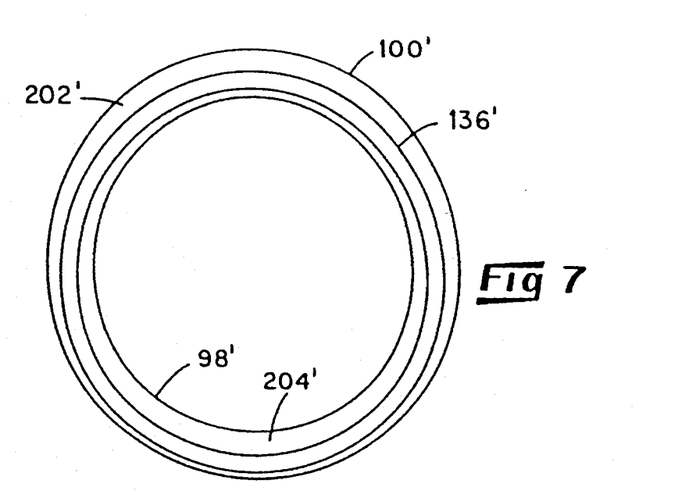
FIG. 7 is an exaggerated cross-sectional view showing a center ring having circular fins and a body ring having circular fins, the fins of the body ring being positioned off-center to the fins of the center ring.

Operation of the coupling 12 will be explained below in connection with the fin configuration represented by FIG. 6. However, it will be understood that other fin configurations may be used. For example, FIG. 7 represents a configuration wherein the center ring 14 has substantially concentric, substantially circular fins, as represented by fins 98", 100' interleaved with substantially concentric, substantially circular fins of body ring 16, as represented by fin 136' to form chambers 202' and 204'. As can be seen, fins 98' and 100' are offset relative to fin 136' such that they are nonconcentric.

Figure 8:
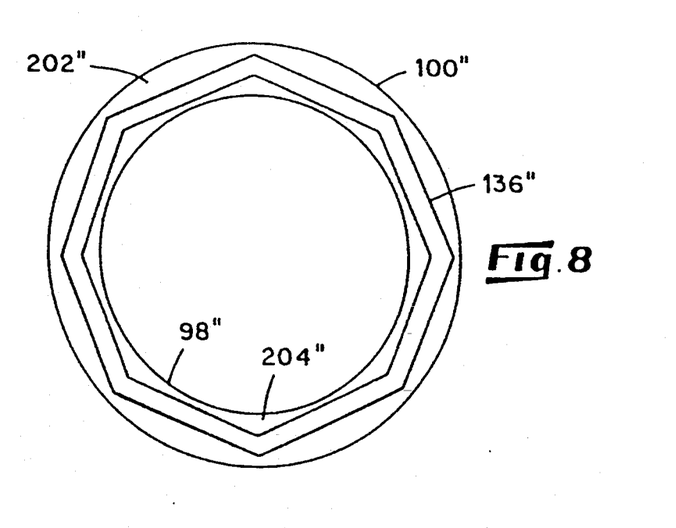
FIG. 8 is an exaggerated cross-sectional view showing a center ring having circular fins and a body ring having octagonal fins.

FIG. 8 shows a further embodiment, wherein the center ring 14 has substantially concentric, substantially circular fins, as represented by fins 98" and 100", interleaved with substantially concentric, substantially octagonal fins of body ring 16, as represented by fin 136" to form chambers 202" and 204".

Returning to FIGS. 1, 2, 5 and 6, the operation of the coupling 10 is described in connection with the depicted embodiment in which the fins 98–104 are preferably substantially concentric and substantially circular, and the fins 134–142 are substantially concentric, substantially oval.

As can be seen, the fins 98–104 are interleaved with the fins 134–142 and define fluid filled chambers adjacent each fin surface, such as the chambers 200, 202 and 204 described in connection with cavity 108 and fin 136. For the sake of brevity, the operation of the coupling 12 is described only in connection with the relationship between cavity 108 (i.e. fins 98 and 100) of the center ring 14 and fin 136 of the body ring 16, it being understood that the remaining interleaved fins cooperate in like manner.

In operation, the coupling 10 transfers rotation of the output shaft 38 of the transfer case 40 to the front drive shaft 42. In the depicted embodiment, the blind bore 54 on the shaft 12 fittingly receives the output shaft 38 and rotates in response to rotation of the output shaft 38. The splines 70 on the shaft 12 directly engage the teeth 86 of the center ring 14 so that the center ring 14 is directly linked to the shaft 12 and rotates in direct response to rotation of the output shaft.

Under low torque conditions (i.e. up to about 225 lbs), the silicone fluid within the chambers 200, 202, and 204 has sufficient viscosity such that the body ring 16 rotates in unison with the center ring 14 under these conditions. Therefore, under low torque conditions, it will be appreciated that the center ring 14 and body ring 16 have the same rotational rate and there is no slippage or relative movement between the center ring 14 and the body ring 16. In addition, it will be appreciated that the rotation of the body ring 16 and center ring 14 provides centrifugal forces of rotation that compress the silicone fluid within the chambers 200, 202 and 204. This compression increases the torque that can be transferred from the center ring 14 to the body ring 16 via the silicone fluid.

Under conditions in which the resistance to rotation of the body ring 16 becomes excessive, such as when the front wheels W of the four wheel drive vehicle are suddenly driven from a low resistance surface (ice) into a high resistance surface (dry asphalt), the wheels W may cause the rotational rate of the body ring 16 to decrease.

Under these conditions, the center ring 14 continues to rotate at the rate of the output shaft 38, but the body ring 16 rotates at a slower rate due to the increased resistance on the front wheels such that the body ring 16 and center ring 14 move relative to one another. The relative movement of the center ring 14 and the body ring 16 results in relative movement between the cavity 108 (i.e. fins 98, 100) and fin 136 such that the orientation of the chambers 202 and 204 changes, as shown in phantom in FIG. 6.

As the chambers 202 and 204 reorient, it will be appreciated that the surfaces of the cavity 108 and fin 136 (i.e. the pump surfaces 114 and 152) exert a pumping action on the fluid and forcibly move or pump the fluid so that it moves relative to fins 98, 100 and 136 and migrates between the chambers 200, 202, and 204. This pumping action further compresses the silicone fluid within the chambers 200, 202, and 204 so that the ability of the fluid to transfer torque between the center ring 14 and the body ring 16 increases in response to the compression of the fluid. Thus, torque transfer increases as slip increases, since increased slip causes increased pumping action and compression of the fluid.

The pumping force exerted on the fluid is a function of the shape of the pump surfaces 114, 152 and the clearance between the pump surfaces 114, 152. Accordingly, it will be appreciated that the same coupling components may be used to provide couplings having a wide range of characteristics and that a coupling may be adjusted to suit the present conditions.

To this end, the distances Y, Z and Z' (discussed in connection with FIG. 5 above) may be varied to adjust the size of the chambers 200, 202 and 204 to provide desired torque characteristics. This may be accomplished, for example, by varying the position of retaining ring 35 to vary the depth of insertion of the fins into the cavities or by providing other means for adjusting the clearance between the pump surfaces. For example, if retaining ring 35 is moved closer to bushing 32 the fin 136 will not be inserted as deeply into the cavity 108. This increases the spacings X, Z and Z' such that the pump surfaces 114, 152 are farther apart and the volumes of the chambers 200, 202, and 204 increases.

This increase in volume decreases the pumping action exerted on the fluid by relative movement of the pump surfaces. Thus, it will be appreciated that the characteristics of the coupling may be adjusted simply by adjusting the clearance between the pump surfaces 114, 152.

In addition, the coupling of the present invention provides a compact, uncomplicated coupling that is resistant to damage. For example, during off-road operation, a four wheel drive vehicle may encounter a situation wherein the front wheels leave the ground and the rotational rate of the wheels increases greatly. This situation is particularly damaging to conventional couplings, with damage typically occurring when the front wheels reengage the ground and large torque forces are applied to the vehicle drive train. The coupling of the present invention allows slip in this situation which helps prevent damage to drive train components.

The foregoing description of preferred embodiments of the present invention are given by way of illustration. In light thereof, those of ordinary skill in the art will appreciate that various modifications may be made without departing from the spirit and scope of the present invention.

We claim:

1. A fluid coupling for use in a drive train to couple a first rotatable member to a second rotatable member to provide rotation of the first and second rotatable members without substantial relative movement of the members during normal operation of the vehicle when the torque in the drive train exerted upon the coupling does not exceed a predetermined break-away torque, said coupling comprising:

reservoir means positioned between said first and second rotatable members for containing a highly viscous fluid, said fluid having a viscosity sufficiently great so that the first rotatable member and the second rotatable member rotate substantially in unison during normal operation when the torque exerted upon the coupling is below the break-away torque;

pump means associated with said reservoir means for exerting pumping forces on said viscous fluid to transfer torque from said first rotatable member to said second rotatable member when the break away torque of the coupling is exceeded, said pump means comprising:

a first rotatable body having a first pump surface rotatable in response to rotation of said first rotatable member for exerting pumping forces on said fluid, a second rotatable body having a second pump surface rotatable in response to the pumping forces and associated with said second rotatable member for transmitting pumping forces from said fluid to said second rotatable member when the break away-torque of the coupling is exceeded so that torque is transferred from the first member to the second member when the first and second members rotate relative to one another, and at least one chamber defined between said first and second pump surfaces for containing an amount of said viscous fluid, said chamber being movable relative to said first pump surface in response to relative movement between said first and second pump surfaces when the break away torque of the coupling is exceeded to produce the pumping forces, so that when the break-away torque is exceeded the torque transfer remains above a level of about the breakaway torque, said pump means being configured, and the viscosity of said fluid being sufficiently great, so that the break-away torque is substantially greater than zero and is about equal to or greater than the normal operating torque of the drive train.

2. The coupling of claim 1, wherein said first rotatable body and said first pump surface further comprise at least one noncircular, cylindrical fin extending outwardly from said first rotatable body in an axial direction, and said second rotatable body and said second pump surface further comprise at least one mating fin extending outwardly from said second rotatable body in an axial direction and configured to fit and rotate within said noncircular, cylindrical fin.

3. The coupling of claim 1, wherein said first rotatable body and said first pump surface further comprise a plurality of substantially concentric circular annular fins extending outwardly from said first rotatable body in an axial direction, and said second rotatable body and said second pump surface further comprise a plurality of substantially concentric non-circular fins extending outwardly in an axial direction therefrom, said first and second rotatable bodies being substantially co-axially oriented for co-rotation and said circular and non-circular annular fins being disposed one within the other so that they are disposed in an interleaved substantially concentric relationship.

4. A fluid coupling for use in a drive train to couple a first rotatable member to a second rotatable member to provide rotation of the first and second rotatable members without substantial relative movement of the members during normal operation of the vehicle when the torque in the drive train exerted upon the coupling does not exceed a predetermined break-away torque, said coupling comprising:

reservoir means positioned between said first and second rotatable members for containing a highly viscous fluid, said fluid having a viscosity sufficiently great so that the first rotatable member and the second rotatable member rotate substantially in unison when the torque exerted upon the coupling is below the break-away torque;

pump means associated with said reservoir means for exerting pumping forces on said viscous fluid to transfer torque from said first rotatable member to said second rotatable member when the first and second rotatable members rotate relative to one another, said pump means comprising:

a first rotatable body having a first pump surface rotatable at a first rate in response to rotation of said first rotatable member for exerting pumping forces on said fluid when the break-away torque is exceeded, a plurality of substantially cylindrical substantially concentric first fins extending outwardly from said first rotatable body in an axial direction, said first pump surface being defined on said first fins, a second rotatable body having a second pump surface rotatable at a second rate in response to the pumping forces and associated with said second rotatable member for transmitting pumping forces from said fluid to said second rotatable member when the break-away torque is exceeded, a plurality of substantially cylindrical substantially concentric second fins extending outwardly from said second rotatable body in an axial direction, said second pump surface being defined on said second fins, said first and second fins being disposed in an interleaved substantially concentric relationship in which each of said first fins is adjacent one of said second fins and said highly viscous fluid is disposed between adjacent first and second fins.

5. The coupling of claim 4, wherein said first and second rotational bodies are configured to produce centrifugal forces operating to compress the viscous fluid when said first and second rotational bodies are rotated so that the torque transferred from said first rotatable member to said second rotatable member increases in response to an increase in said first and second rotational rates and also increases in response to increased relative rotational speed between the first and second rotatable bodies.

6. The coupling of claim 4, wherein said viscous fluid has a first pressure when said first and second rotational rates are zero, a second pressure that is greater than the first pressure when said first and second rotational rates are equal and greater than zero, and a third pressure that is greater than the first pressure when the first rotational rate is greater than the first rotational rate.

7. A fluid coupling for use in a drive train to couple a first rotatable member to a second rotatable member to provide rotation of the first and second rotatable members without substantial relative movement of the members during normal operation of the vehicle when the torque in the drive train exerted upon the coupling does not exceed a predetermined break-away torque and to provide relative rotation of the first and second rotatable members and to transfer torque from the first rotatable member to the second rotatable member when torque conditions above the predetermined break-away torque are encountered, said coupling comprising:

a first rotatable body for mounting on and rotating with the first rotatable member;

a second rotatable body for mounting on and rotating with the second rotatable member;

a plurality of substantially cylindrical substantially concentric first fins extending outwardly from said first rotatable body in an axial direction and defining a plurality of substantially cylindrical substantially concentric cavities;

a plurality of substantially cylindrical substantially concentric second fins extending outwardly from said second rotatable body in an axial direction, each of said second fins being disposed within one of said cavities;

a highly viscous fluid disposed within said cavities for contacting said first and second fins, said fluid having a viscosity sufficiently great so that the first rotatable member and the second rotatable member rotate substantially in unison when the torque exerted upon the coupling is below the break-away torque and rotate relative to one another when the torque exerted upon the coupling is above the break-away torque so that when the break-away torque is exceeded the torque transfer remains above a level of about the break-away torque;

support means associated with said first and second rotatable bodies for maintaining said second fins within said cavities; and seal means associated with said first and second rotatable bodies and defining a sealed reservoir around said first and second fins for containing said viscous fluid.

* * * * *